United States Patent
Liu (10) Patent No.: US 8,954,013 B2
(45) Date of Patent: Feb. 10, 2015

(54) DRIVING STRENGTH CONTROL APPARATUS, DRIVING STRENGTH CONTROL METHOD AND TERMINAL EQUIPMENT

(75) Inventor: Yinong Liu, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 209 days.

(21) Appl. No.: 13/483,163

(22) Filed: May 30, 2012

(65) Prior Publication Data

US 2012/0306544 A1 Dec. 6, 2012

(30) Foreign Application Priority Data

May 30, 2011 (CN) .......................... 2011 1 0142269

(51) Int. Cl.
  *H04B 17/00* (2006.01)
  *H04M 19/04* (2006.01)
  *G06F 13/40* (2006.01)

(52) U.S. Cl.
  CPC ........... *H04M 19/04* (2013.01); *G06F 13/4086* (2013.01)
  USPC .................................... 455/67.11; 455/226.1

(58) Field of Classification Search
  CPC .......... H04B 1/00; H04B 1/0475; H04B 7/00; H04B 17/00; H04M 19/00; H04M 19/04; H04L 25/00; H04L 25/027; H04L 25/028; H04L 25/0375; H04L 25/061
  USPC ............... 455/63.1, 67.11, 67.14, 226.1, 313, 455/317, 318, 334; 375/224, 226, 231, 232; 327/108, 172, 175
  See application file for complete search history.

(56) References Cited

U.S. PATENT DOCUMENTS

| 7,437,137 B2* | 10/2008 | Fiedler .......................... 455/317 |
| 2004/0217792 A1* | 11/2004 | Fletcher et al. ............... 327/175 |
| 2005/0099852 A1 | 5/2005 | Chang |
| 2005/0285648 A1* | 12/2005 | Wilson et al. ................. 327/172 |
| 2006/0181303 A1 | 8/2006 | Dreps et al. |
| 2011/0075496 A1 | 3/2011 | Mueller |

FOREIGN PATENT DOCUMENTS

WO  00/51256 A1  8/2000

OTHER PUBLICATIONS

International Preliminary Report on Patentability, corresponding to PCT/IB2012/001050, mailed on Dec. 12, 2013.
International Search Report, corresponding to PCT/IB2012/001050, mailed on Aug. 9, 2012.
Written Opinion of the International Searching Authority, corresponding to PCT/IB2012/001050, mailed on Aug. 9, 2012.

* cited by examiner

*Primary Examiner* — Thanh Le
(74) *Attorney, Agent, or Firm* — Renner, Otto, Boisselle & Sklar, LLP (57) ABSTRACT

The embodiments of the present invention provide a driving strength control apparatus and method and terminal equipment. The control apparatus comprises: a signal receiving unit to receive a test signal transmitted by a peripheral device; a signal sampling unit to sample the test signal received by the signal receiving unit to obtain a plurality of rising edges and falling edges of the test signal; an interval measuring unit to measure the time interval between a rising edge and a falling edge, or between a rising edge and another rising edge, or between a falling edge and another falling edge; and a controlling unit to adjust the driving strength imposed on the peripheral device according to the time interval. With the embodiments of the present invention, the driving strengths imposed on the peripheral device may be made identical, preventing signal deviation and improving the quality of compatibility.

20 Claims, 6 Drawing Sheets

DRIVING STRENGTH CONTROL APPARATUS, DRIVING STRENGTH CONTROL METHOD AND TERMINAL EQUIPMENT

TECHNICAL FIELD

The present invention relates to the field of electronics, and in particular to a driving strength control apparatus, driving strength control method and terminal equipment.

BACKGROUND ART

As the development of communication technologies continues, terminal equipment is widely used. The terminal equipment is integrated with many peripheral devices which may be classified into internal peripheral devices and external peripheral devices.

An internal peripheral devices may include an internal memory (such as an SDRAM, etc.), an I2C device (such as a camera, etc.), and a system clock, etc; and an external peripheral device may include a secure digital (SD) card, a subscriber identity module (SIM) card, and USB devices, etc. The driving strength of an external peripheral device is the driving power for the external peripheral device.

Currently, in the design of electronic devices, the driving strength of a peripheral device depends on the driving strength sent out by the controller and the load of the peripheral device, the load being affected by the internal resistance of the peripheral device and the distance between the peripheral device and the controller, etc.

SUMMARY OF THE INVENTION

However, there is a problem in the prior art, that is, since the providers of the peripheral devices are different, the loads of the peripheral devices are different, but the driving strength sent out by the controller is fixed, so the driving strengths imposed on (also meaning received by) the peripheral device are different, possibly resulting in signal deviations.

The embodiments of the present invention provide a driving strength control apparatus and method and terminal equipment, with the object of adjusting the driving strength of a peripheral device, so that the driving strengths received by the peripheral device are identical.

According one aspect of the embodiments of the present invention, there is provided a driving strength control apparatus, comprising:

a signal receiving unit to receive a test signal for controlling a driving strength transmitted by a peripheral device;

a signal sampling unit to sample the test signal via a clock signal to obtain a plurality of rising edges and falling edges of the test signal;

an interval measuring unit to measure the time interval between a rising edge and a falling edge, or between a rising edge and another rising edge, or between a falling edge and another falling edge; and a controlling unit to adjust the driving strength received by the peripheral device according to the time interval.

According another aspect of the embodiments of the present invention, the control apparatus further comprises:

a command transmitting unit to transmit to the peripheral device a test command including a data sequence; and the signal receiving unit is further used to receive a test signal transmitted by the peripheral device according to the test command.

According a further aspect of the embodiments of the present invention, the controlling unit is further used to notify the peripheral device, according to the time interval, to adjust the driving strength.

According a still further aspect of the embodiments of the present invention, the controlling unit specifically comprises:

a comparing unit to compare the time interval with a predetermined value, the predetermined value being predetermined according to the data sequence in the test command; and an adjusting unit to increase the driving strength received by the peripheral device if the time interval is less than the predetermined value, and decrease the driving strength received by the peripheral device if the time interval is greater than the predetermined value.

According a still further aspect of the embodiments of the present invention, the control apparatus further comprises:

a signal processing unit connected to the signal receiving unit to buffer and amplify the test signal.

According a still further aspect of the embodiments of the present invention, the clock signal is a high-frequency clock signal, and the control apparatus further comprises:

a clock processing unit connected to the signal sampling unit to generate the high-frequency clock signal through a reference clock signal, so that the signal sampling unit performs sampling through the high-frequency clock signal.

According a still further aspect of the embodiments of the present invention, the clock processing unit is a phase-locked loop, and the frequency of the reference clock signal is 26 MHz, and the frequency of the high-frequency clock signal is 1 GHz.

According a still further aspect of the embodiments of the present invention, the interval measuring unit is a wide-band oscilloscope.

According a still further aspect of the embodiments of the present invention, there is provided a driving strength control method, comprising:

receiving a test signal for controlling a driving strength transmitted by a peripheral device;

sampling the received test signal via a clock signal to obtain a plurality of rising edges and falling edges of the test signal;

measuring the time interval between a rising edge and a falling edge, or between a rising edge and another rising edge, or between a falling edge and another falling edge; and adjusting the driving strength received by the peripheral device according to the time interval.

According a still further aspect of the embodiments of the present invention, before receiving the test signal transmitted by the peripheral device, the control method further comprises:

transmitting to the peripheral device a test command including a data sequence; and receiving a test signal transmitted by the peripheral device according to the test command.

According a still further aspect of the embodiments of the present invention, after measuring the time interval, the control method further comprises:

notifying the peripheral device, according to the time interval, to adjust the driving strength.

According a still further aspect of the embodiments of the present invention, the step of adjusting the driving strength received by the peripheral device according to the time interval comprises:

comparing the time interval with a predetermined value, the predetermined value being predetermined according to the data sequence in the test command; and increasing the driving strength received by the peripheral device if the time interval is less than the predetermined value, and decreasing the driving strength received by the peripheral device if the time interval is greater than the predetermined value.

According a still further aspect of the embodiments of the present invention, after receiving the test signal transmitted by the peripheral device, the control method further comprises:

buffer and amplify the test signal.

According a still further aspect of the embodiments of the present invention, the control method further comprises:

generating a high-frequency clock signal through a reference clock signal; and performing sampling on the received test signal through the high-frequency clock signal.

According a still further aspect of the embodiments of the present invention, the frequency of the reference clock signal is 26 MHz, and the frequency of the high-frequency clock signal is 1 GHz.

According a still further aspect of the embodiments of the present invention, there is provided terminal equipment, comprising the control apparatus as described above.

An advantage of the present invention is that a time interval between a rising edge and a falling edge is obtained through a test signal that is provided to the peripheral device, and the driving strength received by the peripheral device is adjusted according to the time interval. In this way, the driving strengths received by the peripheral device may be made identical, preventing signal deviation and improving the quality of compatibility.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile terminal", "portable electronic device", or "portable communication device", comprises all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

Figure 1:
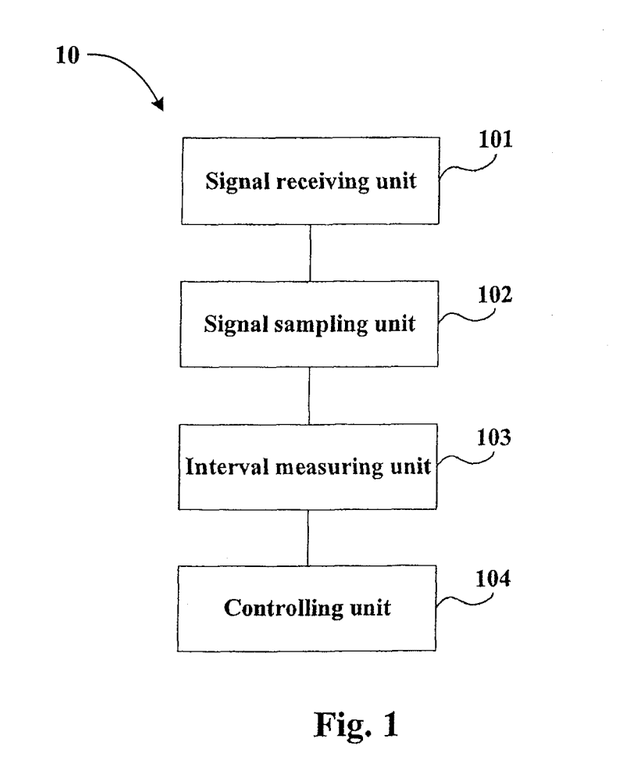
FIG. 1 is a schematic diagram showing the structure of a control apparatus of the embodiments of the present invention.

The embodiments of the present invention provide a driving strength control apparatus 10. FIG. 1 is a schematic diagram showing the structure of the control apparatus of the embodiments of the present invention. As shown in FIG. 1, the control apparatus includes a signal receiving unit 101, a signal sampling unit 102, an interval measuring unit 103, and a controlling unit 104.

The signal receiving unit 101 receives a test signal for controlling a driving strength transmitted by a peripheral device;

the signal sampling unit 102 samples the test signal received by the signal receiving unit 101 via a clock signal to obtain a plurality of rising edges and falling edges of the test signal;

the interval measuring unit 103 measures the time interval between a rising edge and a falling edge, or between a rising edge and another rising edge, or between a falling edge and another falling edge; and the controlling unit 104 adjusts the driving strength received by the peripheral device according to the time interval.

In this embodiment, the peripheral device may include memory card, etc. The control apparatus 10 may be integrated within the terminal equipment (see FIG. 7). The peripheral device may be connected with the control apparatus through an interface module and use parallel transmission mode, for example, to transmit data using n number of data lines including Data 0, Data 1 . . . Data n–1 (see FIG. 4). However, the present invention is not limited thereto, particular mode of implementation may be determined as actually required.

In this embodiment, the peripheral device may first transmit a test signal to the control apparatus 10, the test signal being related to the load of the peripheral device. Thus, the control apparatus 10 may adjust the driving strength received by the peripheral device according to the result of processing of the test signal.

Figure 4:
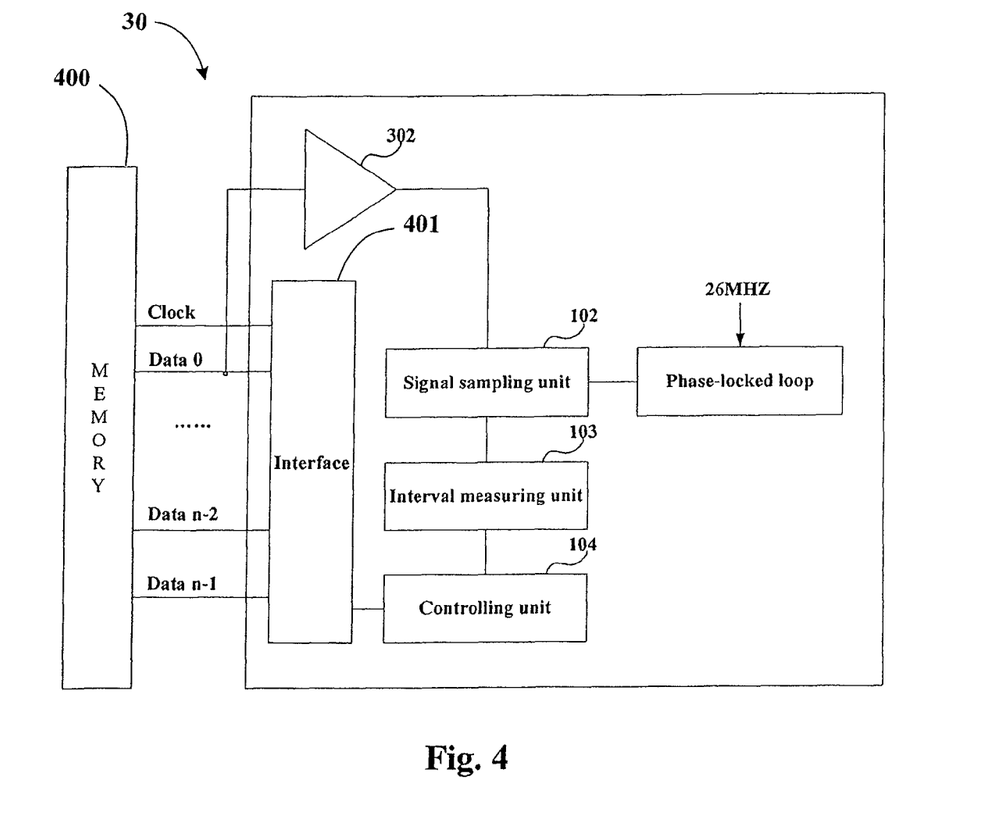
FIG. 4 is a schematic diagram of the control apparatus of an embodiment of the present invention.

In another embodiment, the control apparatus may first transmit a test command including a data sequence to the peripheral device, for example, transmitting on data line designated Data 0 (FIG. 4). The data sequence may be, for example, 01010101, etc. After the peripheral device receives the test command, it may feed back a test signal according to the test command. The fed back test signal is related to the load of the peripheral device and thus, the driving strength sent out by a controller in the terminal equipment (FIG. 7) may be adjusted through or by using the test signal, such that the driving strengths that are received by the peripheral device are consistent, e.g., are the same.

In implementation, after the signal receiving unit 101 receives the test signal transmitted by the peripheral device according to the test command, the signal sampling unit 102 performs sampling via a clock signal to obtain a rising edge and a falling edge of the test signal, and a plurality of rising edges and falling edges may be obtained.

The interval measuring unit 103 may measure the time interval between a rising edge and a falling edge of the test signal, or between a rising edge and another rising edge, or between a falling edge and another falling edge.

Figure 2:
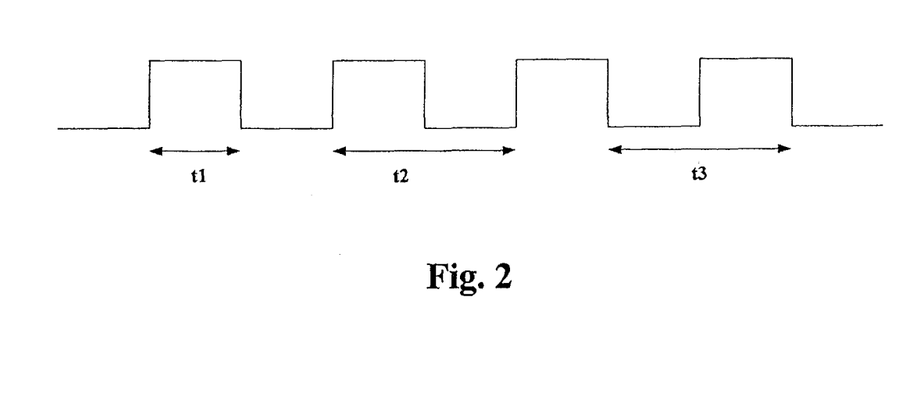
FIG. 2 is a schematic diagram showing the rising edge and falling edge of a test signal in the embodiments of the present invention.

FIG. 2 is a schematic diagram showing the rising edge and falling edge of a test signal of the embodiments of the present invention. As shown in FIG. 2, the interval measuring unit 103 may measure the time interval t1 between a rising edge and a falling edge, may measure the time interval t2 between a rising edge and another rising edge, and may measure the time interval t3 between a falling edge and another falling edge. It should be noted that FIG. 2 is exemplary only, and the present invention is not limited thereto.

In implementation, the controlling unit 104 may include a comparing unit and an adjusting unit (not shown). The comparing unit is used to compare the time interval with a predetermined value, the predetermined value being predetermined according to the test signal or according to the data sequence in the test command. The adjusting unit is used to increase the driving strength received by the peripheral device if the time interval is less than the predetermined value, and decrease the driving strength received by the peripheral device if the time interval is greater than the predetermined value.

Furthermore, the controlling unit 104 may also notify the peripheral device to adjust the driving strength according to the comparison result of the time interval and the predetermined value. It notifies the peripheral device to increase the driving strength if the time interval is less than the predetermined value, and notifies the peripheral device to decrease the driving strength if the time interval is greater than the predetermined value.

In this embodiment, the rising edges and falling edges of the test signal may be obtained through sampling, for example, in a manner of the prior art, which shall not be described any further. The time interval between a rising edge and a falling edge, or between a rising edge and another rising edge, or between a falling edge and another falling edge is related to the load of the peripheral device. And the predetermined value is related to the test signal or the test command. Thus, the driving strength received by the peripheral device may be adjusted through comparing the predetermined value with the time interval between a rising edge and a falling edge, or between a rising edge and another rising edge, or between a falling edge and another falling edge.

For example, the control apparatus first transmits a test command to the peripheral device, the data sequence in the test command is 01010101, and the transmission time interval between each bit of data is fixed to 1 second, thus, the predetermined value may be 0.01 second. If an SD memory card is connected to a mobile phone via a card reader and is relatively far away from the controller, the obtained time interval between a rising edge and a falling edge is 0.995 second.

In this way, in a case where an SD memory card is connected to a mobile phone via a card reader, the obtained time interval 0.995 second between a rising edge and another rising edge is far greater than the predetermined value 0.01 second. Therefore, the control unit 104 would decrease the driving strength received by the SD memory card.

In this embodiment, the driving strength received by the peripheral device may be adjusted through adjusting the driving power sent to the peripheral device, such as changing the power parameter, etc. Or the peripheral device may be notified, then the peripheral device itself adjusts the driving strength.

The above description of adjusting driving strength is exemplary only, and the present invention is not limited thereto. Particular mode of implementation may be determined as actually required.

It can be seen from the above embodiment that the time interval between a rising edge and a falling edge is obtained through or by using the test signal, and the driving strength received by the peripheral device may be adjusted according to the time interval. In this way, the driving strengths received by the peripheral device may be made identical, preventing signal deviation and improving the quality of compatibility.

Figure 3:
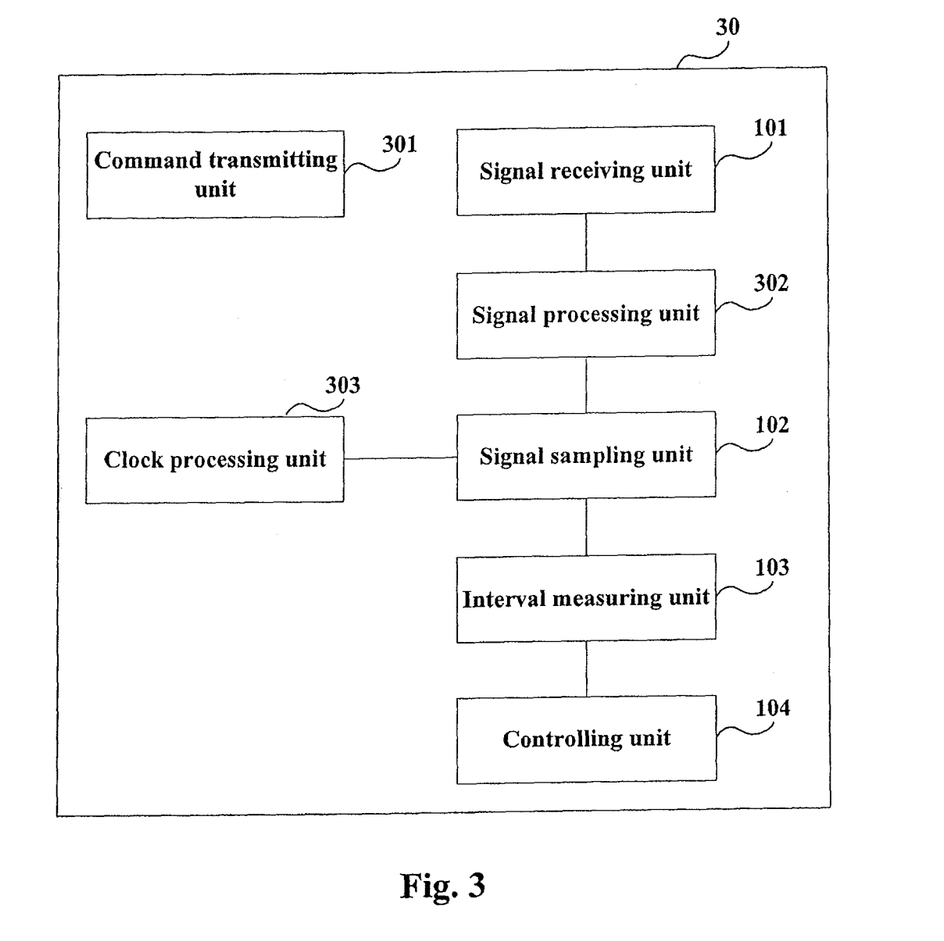
FIG. 3 is another schematic diagram showing the structure of the control apparatus of an embodiment of the present invention.

FIG. 3 is another schematic diagram showing the structure of the control apparatus 30 of the embodiments of the present invention. As shown in FIG. 3, the control apparatus 30 includes a signal receiving unit 101, a signal sampling unit 102, an interval measuring unit 103 and a controlling unit 104 as described above, which shall not be described any further.

As shown in FIG. 3, the control apparatus 30 may further include a command transmitting unit 301 to transmit a test command including a data sequence to the peripheral device.

Furthermore, the signal receiving unit 101 may be used to receive a test signal transmitted by the peripheral device according to the test command. The controlling unit 104 may be used to notify the peripheral device, according to the time interval, to adjust the driving strength.

As shown in FIG. 3, the control apparatus 30 may further include a signal processing unit 302.

The signal processing unit 302 is connected to the signal receiving unit 101 and the signal sampling unit 102 to buffer and amplify the test signal received by the signal receiving unit 101. Thus, the test signal may be further processed, thereby improving the precision of signal processing.

As shown in FIG. 3, the control apparatus 30 may further include a clock processing unit 303.

The clock processing unit 303 is connected to the signal sampling unit 102 to generate a high-frequency clock signal through a reference clock signal, so that the signal sampling unit 102 performs sampling through the high-frequency clock signal.

In particular, the clock processing unit 303 may be a phase-locked loop, and the frequency of the reference clock signal is 26 MHz, and the frequency of the high-frequency clock signal is 1 GHz. Thus, the clock signal may be upgraded as a high-frequency signal, thereby improving the sampling precision.

Furthermore, the interval measuring unit 103 may be a wide-band oscilloscope.

FIG. 4 is a schematic diagram of the control apparatus 30 embodiment of the present invention. As shown in FIG. 4, taking the peripheral device as a memory 400, for example, the command transmitting unit 301 (FIG. 3) and the signal receiving unit 101 (FIG. 3) are implemented through a memory card interface, and the clock processing unit 303 (FIG. 3) is a phase-locked loop.

It can be seen from the above embodiment that the time interval between a rising edge and a falling edge is obtained through or by using the test signal, and the driving strength received by the peripheral device may be adjusted according to the time interval. In this way, the driving strengths received by the peripheral device may be made identical, preventing signal deviation and improving the quality of compatibility.

Figure 5:
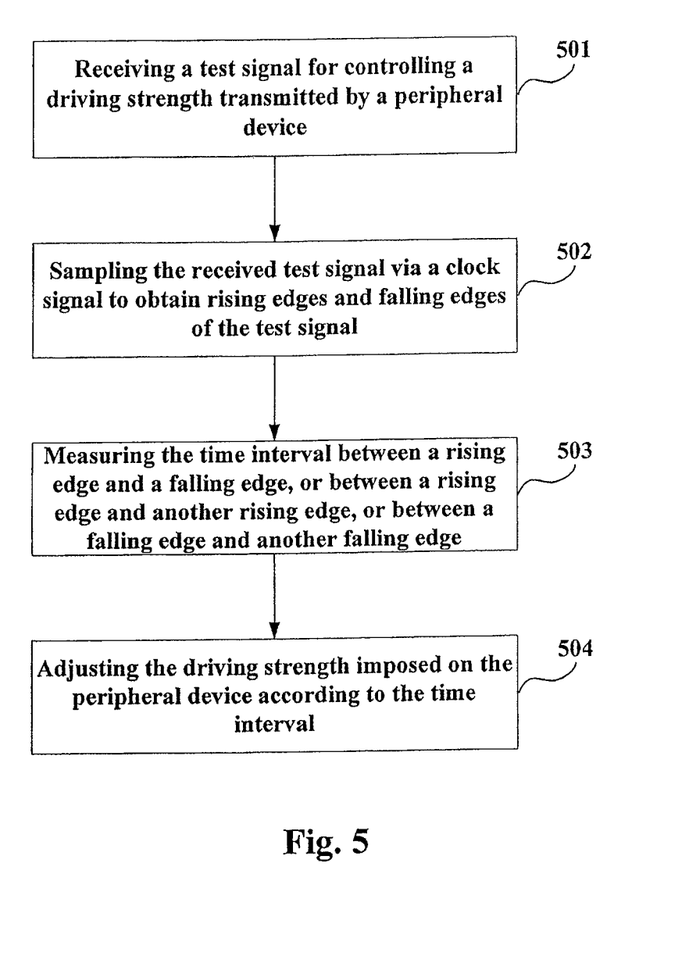
FIG. 5 is a flowchart of the control method of the embodiments of the present invention.

The embodiments of the present invention further provide a driving strength control method. FIG. 5 is a flowchart of the control method of the embodiments of the present invention. As shown in FIG. 5, the control method includes:

step 501: receiving, by terminal equipment, a test signal for controlling a driving strength transmitted by a peripheral device;

step 502: sampling the received test signal via a clock signal to obtain a plurality of rising edges and falling edges of the test signal;

step 503: measuring the time interval between a rising edge and a falling edge, or between a rising edge and another rising edge, or between a falling edge and another falling edge; and step 504: adjusting the driving strength received by the peripheral device according to the time interval.

In an exemplary implementation, the control method may further comprise notifying, according to the time interval, the peripheral device to adjust the driving strength.

Figure 6:
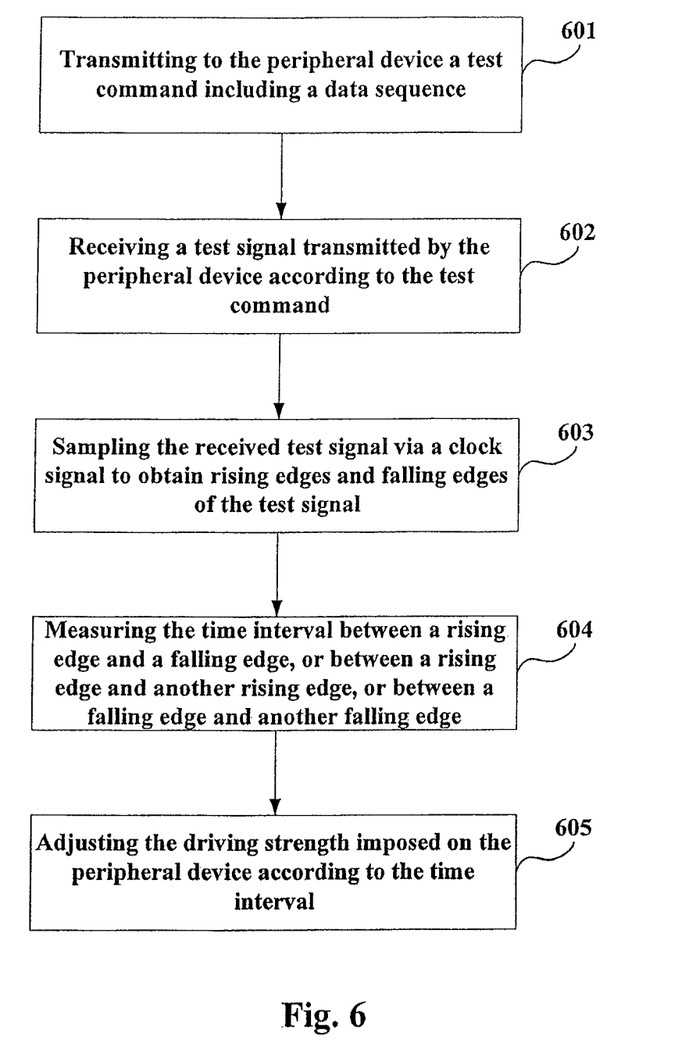
FIG. 6 is another flowchart of the control method of the embodiments of the present invention.

FIG. 6 is another flowchart of the control method of the embodiments of the present invention. As shown in FIG. 6, the control method includes:

step 601: transmitting, by the terminal equipment, to the peripheral device a test command including a data sequence; and step 602: receiving a test signal transmitted by the peripheral device according to the test command;

step 603: sampling the received test signal via a clock signal to obtain a plurality of rising edges and falling edges of the test signal;

step 604: measuring the time interval between a rising edge and a falling edge, or between a rising edge and another rising edge, or between a falling edge and another falling edge; and step 605: adjusting the driving strength received by the peripheral device according to the time interval.

Furthermore, step 605 may specifically include: comparing the time interval with a predetermined value, the predetermined value being predetermined according to the data sequence in the test command; and increasing the driving strength received by the peripheral device if the time interval is less than the predetermined value, and decreasing the driving strength received by the peripheral device if the time interval is greater than the predetermined value.

Furthermore, after step 501 or 602, i.e. after receiving the test signal transmitted by the peripheral device, the control method may further include buffering and amplifying the received test signal.

Furthermore, the control method may include generating a high-frequency clock signal through a reference clock signal; and in step 502 or 603, performing sampling on the received test signal through the high-frequency clock signal.

For example, the frequency of the reference clock signal may be 26 MHz, and the frequency of the high-frequency clock signal may be 1 GHz.

It can be seen from the above embodiment that the time interval between a rising edge and a falling edge is obtained through or by using the test signal, and the driving strength received by the peripheral device may be adjusted according to the time interval. In this way, the driving strengths received by the peripheral device may be made identical, preventing signal deviation and improving the quality of compatibility.

The embodiments of the present invention further provide terminal equipment, including the above-described control apparatus.

Figure 7:
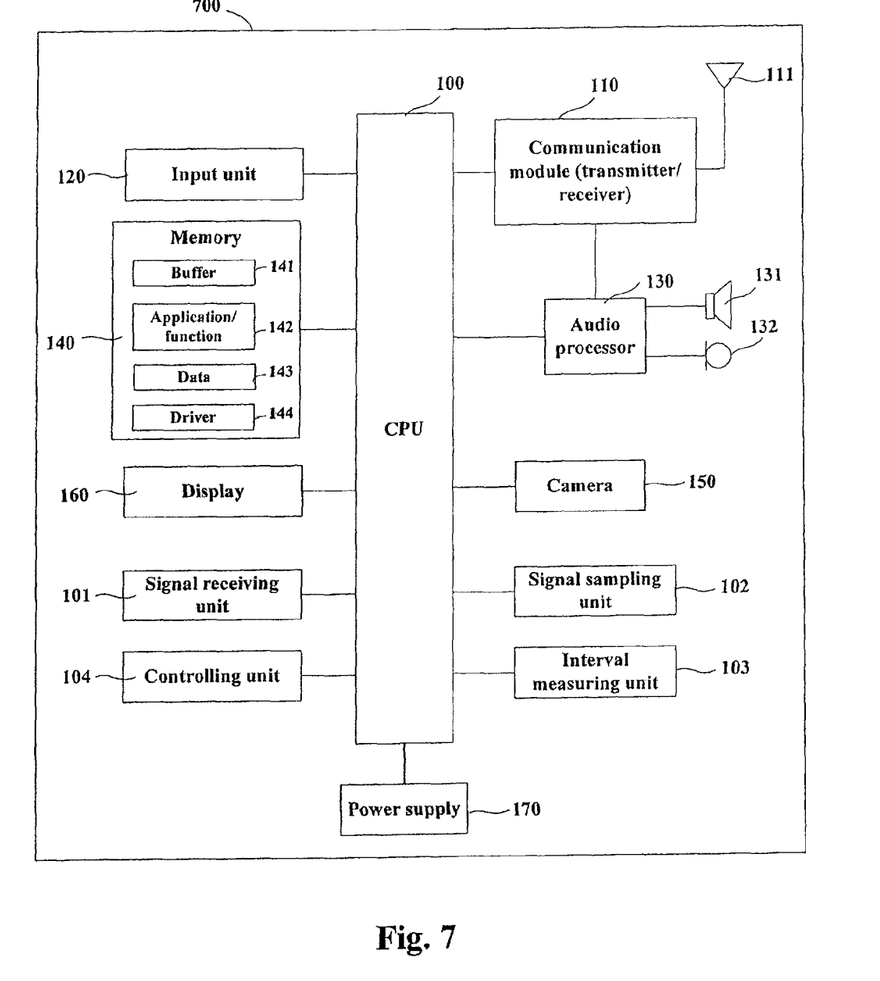
FIG. 7 is a block diagram of the systematic structure of the terminal equipment of the embodiments of the present invention.

FIG. 7 is a block diagram of the systematic structure of the terminal equipment 700 of the embodiments of the present invention, in which the above-described signal receiving unit 101, the signal sampling unit 102, the interval measuring unit 103, and the controlling unit 104 are included. This figure is exemplary, and other types of structures may also be used to supplement or replace such a structure, so as to realize telecommunications functions or other functions.

As shown in FIG. 7, the terminal equipment 700 may further include a central processing unit 100, a communication module 110, an input unit 120, an audio processor 130, a memory 140, a camera 150, a display 160, and a power supply 170.

The receiving unit 101, the signal sampling unit 102, the interval measuring unit 103, and the controlling unit 104 may be connected directly, may be connected via the central processing unit 100, or may be integrated into the central processing unit 100.

The central processing unit 100 (sometimes referred to as a controller or an operation control, which may include a microprocessor or other processor devices and/or logic devices) receives input and controls every components and operations of the terminal equipment 700. The input unit 120 provides input to the central processing unit 100. The input unit 120 is, for example, a key or a touch input device. The camera 150 is used to take image data and provide the taken image data to the central processing unit 100, for use in a conventional manner, such as storage, and transmission, etc.

The power supply 170 is used to supply electric power to the terminal equipment 700. The display 160 is used to display the display objects, such as images, and characters, etc. The display may be, for example, an LED display, but it is not limited thereto.

The memory 140 is coupled to the central processing unit 100. The memory 140 may be a solid-state memory, such as a read-only memory (ROM), a random access memory (RAM), and a SIM card, etc. It may be such a memory that stores information when the power is interrupted, may be selectively erased and provided with more data. Examples of such a memory are sometimes referred to as an EPROM, etc. The memory 140 may also be certain other types of devices. The memory 140 includes a buffer memory 141 (sometimes referred to as a buffer). The memory 140 may include an application/function storing portion 142 used to store application programs and function programs, or to execute the operation flow of the terminal equipment 700 via the central processing unit 100.

The memory 140 may further include a data storing portion 143 used to store data, such as a contact person, digital data, pictures, voices and/or any other data used by other electronic devices. A driver storing portion 144 of the memory 140 may include various types of drivers of electronic devices for the communication function and/or for executing other functions (such as application of message transmission, and application of directory, etc.) of the electronic devices.

The communication module 110 is a transmitter/receiver 110 transmitting and receiving signals via an antenna 111. The communication module (transmitter/receiver) 110 is coupled to the central processing unit 100 to provide input signals and receive output signals, this being similar to the case in a conventional mobile phone.

A plurality of communication modules 110 may be provided in the same electronic device for various communication technologies, such a cellular network module, a Bluetooth module, and/or wireless local network module, etc. The communication module (transmitter/receiver) 110 is also coupled to a loudspeaker 131 and a microphone 132 via the audio processor 130, for providing audio output via the loudspeaker 131 and receiving the audio input from the microphone 132, thereby achieving common telecommunications functions. The audio processor 130 may include any appropriate buffers, decoders, and amplifiers, etc. The audio processor 130 is further coupled to the central processing unit 100, thereby enabling the recording of voices in this device via the microphone 132 and playing the voices stored in this device via the loudspeaker 131.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact structure and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

The invention claimed is:

1. A driving strength control apparatus, comprising:
a command transmitting unit to transmit to a peripheral device a test command including a data sequence;
a signal receiving unit to receive a test signal for controlling a driving strength transmitted by the peripheral device, wherein the received test signal is transmitted by the peripheral device according to the test command;
a signal sampling unit to sample the test signal via a clock signal to obtain a plurality of rising edges and falling edges of the test signal;

an interval measuring unit to measure the time interval between a rising edge and a falling edge, or between a rising edge and another rising edge, or between a falling edge and another falling edge; and a controlling unit to adjust the driving strength received by the peripheral device according to the time interval.

2. The control apparatus according to claim 1, wherein the controlling unit is further used to notify the peripheral device, according to the time interval, to adjust the driving strength.

3. The control apparatus according to claim 1, wherein the controlling unit comprises:

a comparing unit to compare the time interval with a predetermined value, the predetermined value being predetermined according to the data sequence in the test command; and an adjusting unit to increase the driving strength received by the peripheral device if the time interval is less than the predetermined value, and decrease the driving strength received by the peripheral device if the time interval is greater than the predetermined value.

4. The control apparatus according to claim 1, wherein the control apparatus further comprises:

a signal processing unit connected to the signal receiving unit to buffer and amplify the test signal.

5. The control apparatus according to claim 1, wherein the clock signal is a high-frequency clock signal, and the control apparatus further comprises:

a clock processing unit connected to the signal sampling unit to generate the high-frequency clock signal through a reference clock signal, so that the signal sampling unit performs sampling through the high-frequency clock signal.

6. The control apparatus according to claim 5, wherein the clock processing unit is a phase-locked loop, and the frequency of the reference clock signal is 26 MHz, and the frequency of the high-frequency clock signal is 1 GHz.

7. The control apparatus according to claim 1, wherein the interval measuring unit is a wide-band oscilloscope.

8. Terminal equipment, comprising the control apparatus as claimed in claim 1.

9. The control apparatus according to claim 1, wherein the control apparatus further comprises:

a signal processing unit connected to the signal receiving unit to buffer and amplify the test signal.

10. The control apparatus according to claim 1, wherein the clock signal is a high-frequency clock signal, and the control apparatus further comprises:

a clock processing unit connected to the signal sampling unit to generate the high-frequency clock signal through a reference clock signal, so that the signal sampling unit performs sampling through the high-frequency clock signal.

11. A driving strength control method, comprising:

transmitting to a peripheral device a test command including a data sequence;

receiving a test signal for controlling a driving strength transmitted by the peripheral device, wherein the received test signal is transmitted by the peripheral device according to the test command;

sampling the received test signal via a clock signal to obtain a plurality of rising edges and falling edges of the test signal;

measuring the time interval between a rising edge and a falling edge, or between a rising edge and another rising edge, or between a falling edge and another falling edge; and adjusting the driving strength received by the peripheral device according to the time interval.

12. The control method according to claim 11, wherein after measuring the time interval, the control method further comprises:

notifying the peripheral device, according to the time interval, to adjust the driving strength.

13. The control method according to claim 11, wherein the step of adjusting the driving strength received by the peripheral device according to the time interval comprises:

comparing the time interval with a predetermined value, the predetermined value being predetermined according to the data sequence in the test command; and increasing the driving strength imposed on the peripheral device if the time interval is less than the predetermined value, and decreasing the driving strength received by the peripheral device if the time interval is greater than the predetermined value.

14. The control method according to claim 11, wherein after receiving the test signal transmitted by the peripheral device, the control method further comprises:

buffer and amplify the test signal.

15. The control method according to claim 11, wherein the control method further comprises:

generating a high-frequency clock signal through a reference clock signal; and performing sampling on the received test signal through the high-frequency clock signal.

16. The control method according to claim 15, wherein the frequency of the reference clock signal is 26 MHz, and the frequency of the high-frequency clock signal is 1 GHz.

17. The control method according to claim 11, wherein after receiving the test signal transmitted by the peripheral device, the control method further comprises:

buffer and amplify the test signal.

18. The control method according to claim 11, wherein the control method further comprises:

generating a high-frequency clock signal through a reference clock signal; and performing sampling on the received test signal through the high-frequency clock signal.

19. A driving strength control apparatus, comprising:

a signal receiving unit to receive a test signal for controlling a driving strength transmitted by a peripheral device;

a signal sampling unit to sample the test signal via a clock signal to obtain a plurality of rising edges and falling edges of the test signal;

an interval measuring unit to measure the time interval between a rising edge and a falling edge, or between a rising edge and another rising edge, or between a falling edge and another falling edge; and a controlling unit to adjust the driving strength received by the peripheral device according to the time interval, wherein the controlling unit comprises:

a comparing unit to compare the time interval with a predetermined value, the predetermined value being predetermined according to the data sequence in the test command; and an adjusting unit to increase the driving strength received by the peripheral device if the time interval is less than the predetermined value, and decrease the driving strength received by the peripheral device if the time interval is greater than the predetermined value.

20. A driving strength control method, comprising:

receiving a test signal for controlling a driving strength transmitted by a peripheral device;

sampling the received test signal via a clock signal to obtain a plurality of rising edges and falling edges of the test signal;

measuring the time interval between a rising edge and a falling edge, or between a rising edge and another rising edge, or between a falling edge and another falling edge; and adjusting the driving strength received by the peripheral device according to the time interval, wherein the step of adjusting the driving strength received by the peripheral device according to the time interval comprises:

comparing the time interval with a predetermined value, the predetermined value being predetermined according to the data sequence in the test command; and increasing the driving strength imposed on the peripheral device if the time interval is less than the predetermined value, and decreasing the driving strength received by the peripheral device if the time interval is greater than the predetermined value.

* * * * *